Nov. 4, 1969   A. RADO ET AL   3,476,326
APPARATUS FOR DEGERMING MAIZE
Filed May 2, 1967   2 Sheets-Sheet 2
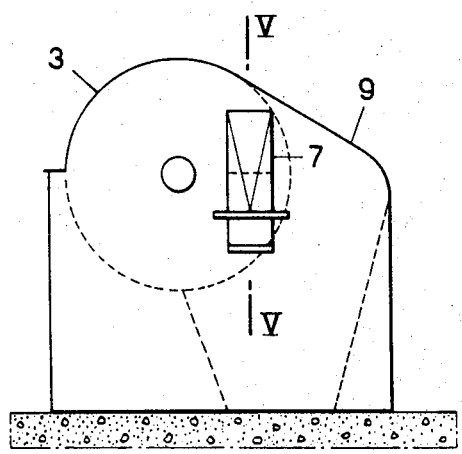
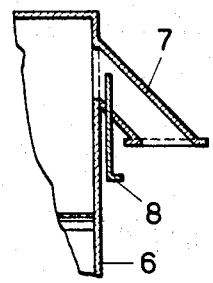
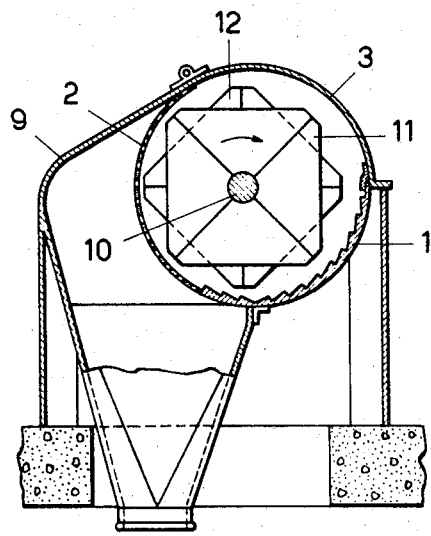
INVENTOR.
ANTONIO RADO
BRUNO G. TOGNAZZA
BY
ATTORNEYS United States Patent Office 3,476,326
Patented Nov. 4, 1969

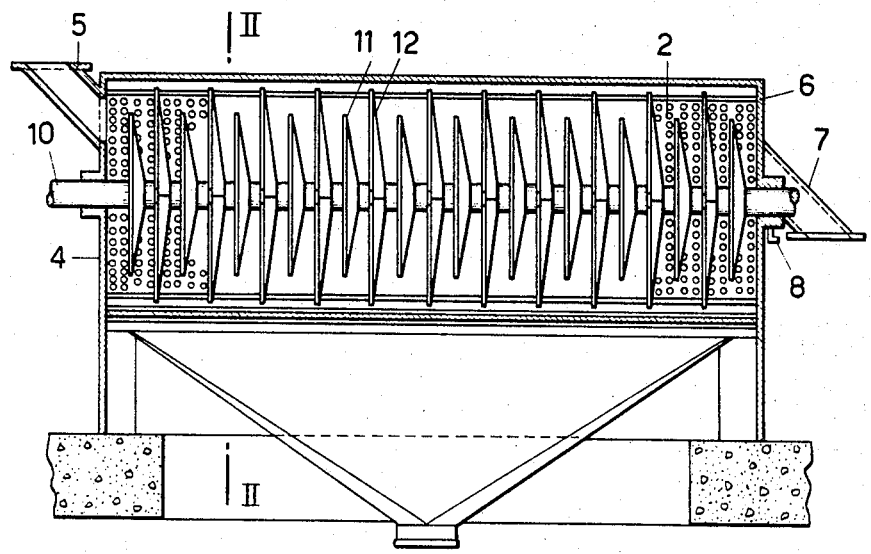
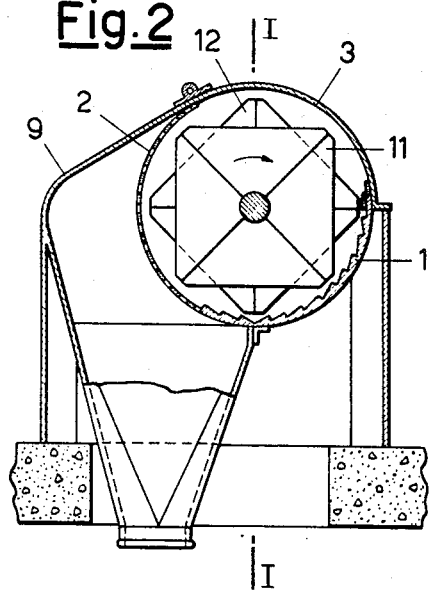
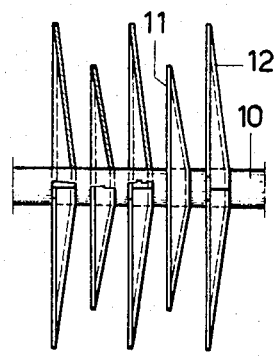

3,476,326
APPARATUS FOR DEGERMING MAIZE
Antonio Rado, Lanzago di Silea, Italy, and Bruno G. Tognazza, Niederuzwill, Switzerland, assignors to Gebruder Buhler AG, Uzwill, Switzerland, a company of Switzerland
Filed May 2, 1967, Ser. No. 635,592
Claims priority, application Italy, May 6, 1966, 10,468/66
Int. Cl. B02c 7/00, 7/12, 7/06
U.S. Cl. 241—73                    9 Claims

ABSTRACT OF THE DISCLOSURE

Maize degerming apparatus having a casing with end openings forming an inlet and an adjustable outlet and having decorticating polygonal discs therein which are concave toward the inlet and convex toward the outlet; the convex side having planar areas formed thereon. The casing has a rough inner portion against which the disc peripheries act and an arcuate foraminous portion through which sufficiently ground material, namely, perisperm membrane and small fractions of flour, germ and grouts, are passed while the remaining seed mass is conducted by the rotary disc action to the outlet.

BACKGROUND OF THE INVENTION

This invention relates to apparatus for degerming maize.

In a conventional method, degerming is carried out as a wet process involving pressure and friction, by coarsely crushing the maize seeds, stripping the perisperm membrane and a portion of the germ, whereas the remaining portion of the latter is freed of the perisperm membrane and subsequently separated by a passage through a roll mill. In this case, a portion of the germ is crushed and a loss of germ yield is the result. Moreover, the power consumption is comparatively high.

In another known method, in which the degerming step is carried out in dry conditions by impact, the maize seeds are broken, the germ is stripped and is subsequently separated by a densimetric table. In this case, however, the perisperm membrane adheres, to a large extent, to the "grouts," thus giving rise to an increase of the fatty substance and fibres content of said "grouts."

SUMMARY OF THE INVENTION

An object of the present invention is to avoid the drawbacks enumerated above. This object is achieved, according to the subject novel method inasmuch as the maize, pretreated for a short time (that is for less than one hour), by moistening and, optionally, by heating, is initially subjected to a decoraticating step so as to strip it of the perisperm membrane, and subsequently to a degerming step proper so as to strip the germ of the endosperm. Said pre-treatment can take place, for example, by washing, soaking and rest, or by conditioning (treatment with heat and moistening). The degerming step proper can be advantageously carried out, either with beating machines or by impact, or also by one or more passes through a roll mill.

An essential part of the apparatus for carrying out the inventive method is a decorticating machine comprising a casing which is at least partially foraminous and a rotor carrying decorticating members and mounted for rotation within said casing, said rotor conveying the maize longitudinally from an inlet to an outlet. This machine is essentially characterized in that the decorticating members consist of polygonal discs which are concave towards the inlet side and convex towards the outlet side, the surface of said discs being formed, at least on the convex face, by planar zones arranged between straight lines connecting the apice of the discs with the axis of the rotor, the subsequent disc being mounted with an angular shift with respect to each other.

A significant advantage afforded by said conformation and arrangement of the decorticating members is that the maize seeds undergo a very gentle treatment. Owing to the particular constructional arrangement of the rotor, the maise seeds, during their slow advance motion from the inlet side to the outlet side of the decorticating machine, are intermixed and subjected to a three-fold decorticating action due to their mutual friction and to their friction against the disc-like rotor members and the casing. The friction between the maize seeds and the casing is advantageously enhanced by providing a rough-surface area in the inner face of the casing. Preferably, the cylindrical casing of the machine is partitioned into three zones, one having an inner rough surface, another foraminous, and the third smooth, the latter acting also as a lid. The major portion of the perisperm stripped from the seeds, admixed with a small amount of flour, germs and "grouts" is directly separated by causing it to pass through the foraminous casing zone.

According to an advantageous embodiment of the decorticating machine, the outlet is placed in a top portion of the header and, in order that the duration of the treatment may be adjusted, the free cross-sectional area of the outlet can be appropriately varied.

The maize discharged from the machine is thoroughly decorticated and the subsequent stripping of the germ from the endosperm is greatly facilitated, thus permitting to obtain, with a good yield, "grouts" with a low content of fatty substances, along with a germ with a high content of said fatty substances.

In order that the features of the inventive decorticating machine may be better understood, an embodiment thereof will be more particularly described in the following, merely by way of example and without any limitation, the description being aided by the accompanying diagrammatical drawings.

BRIEF DESCRIPTION OF THE DRAWINGS

In the drawings:
FIG. 1 is a vertical longitudinal sectional view, taken along the line I—I of FIG. 2, of the inventive decorticating machine.
FIG. 2 is a cross-sectional view, taken along the line II—II of FIG. 1.
FIG. 3 is illustrative of a portion of the machine rotor, few decorticating members being shown partly in view and partly in cross-section.
FIG. 4 is a front view of the machine, as viewed from the outlet side.
FIG. 5 is a vertical sectional view through the outlet, taken along the line V—V of FIGURE 4, and
FIG. 6 is a cross-sectional view, similar to that of FIG. 2, showing an alternative embodiment of the machine.

DESCRIPTION OF THE PREFERRED EMBODIMENT

In the embodiment of the decorticating machine as shown in the drawings, more particularly in FIGS. 1 and 2, the fixed frame is formed by a cylindrical casing which is substantially divided into three portions: an internally rough portion 1, a foraminous portion 2 and a smooth portion, forming a lid 3. The roughness of the portion 1 can be obtained by ridges, corrugations or other irregular surface patterns.

At the header 4 (to the left as viewed in FIG. 1) there is an inlet 5 and, at the opposite header 6, an outlet 7 which is properly located at the level of the rotor axis or at a higher level.

In order that an adjustment, or variation, of the duration of the passes and of the treatment of the material through the machine may be achieved, it is of particular advantage to mount in the outlet 7 appropriate members for modifying the outlet cross-sectional area, such as a gate 8 (FIG. 5). To the foraminous portion 2 of the casing, a hopper 9 is connected, so as to collect and dump the perisperm membrane stripped from the seeds and those small aliquots of flour, germ and "grouts" passing through the foraminous portion of the casing.

The machine headers rotatably support the rotor, which essentially comprises a plurality of decorticating members fastened to a shaft 10. Said members consist of polygonal discs 11, 12 which are concave towards the inlet side and convex towards the outlet side. In the example shown, said discs 11, 12 are all quadrangular but they can have any other polygonal contour, such as a triangular outline.

It is possible to use, in the same machine, discs of different shapes. It is preferred that the discs 11 and 12 have, at least on their convex side, a pyramidal shape, with substantially planar faces confined by straight lines going from the disc corners to the center of the rotor axis. Consecutive discs of the rotor are angularly shifted with respect to one another, for example, according to a symmetrical pattern. The direction of rotation of the rotor is such (see arrow in FIG. 2) that every point of its periphery passes, during the sequential rotation, in front of the rough surface portion 1, then in front of the foraminous portion 2 and eventually in front of the smooth portion 3 of the casing.

The rotor shaft 10 can be eccentrically supported with respect to the fixed framing (see FIG. 6) and, precisely, shifted towards the foraminous portion 2 of the cylindrical casing, a cleaning effect being thus provided for the foraminous portion 2.

The operation of the machine before described is as follows:

The maize seeds, previously treated for a time of less than one hour, for example by moistening, are fed into the machine in a manner known per se through the inlet 5. The moving rotor slowly conveys the fed in seeds towards the outlet 7 due to the action of the convex side of the polygonal discs 11 and 12. The contrasting forces due to the rotor thrust and the braking action of the rough and the foraminous portions of the casing give rise to a continuous friction between the maize seeds and the working surfaces and also between the maize seeds themselves, the desired gentle and effective decorticating action being thus simultaneously achieved. The perisperm membrane stripped from the seeds and that very small fraction of flour, germ and grouts passing through the foraminous portion 2 of the casing are collected in the hopper 9 and dumped therefrom for subsequent uses or treatments.

The mass of decorticating seeds having still the germ attached thereto, comes out of the adjustable outlet 7 to undergo the subsequent degerming step proper, which can be carried out, for example, in an impact mill well known in the art or also by one or more passes through a mill roll.

Upon completion of degerming, the product is then passed to the apparatus for separating the grouts from the germ, apparatus which is per se well known, such as a dosimetric table, etc.

We claim:
1. A decorticating apparatus comprising a casing which is at least partially foraminous and a rotor which carries decorticating members and is rotated within said casing for longitudinally conveying maize from an inlet mouth to an outlet mouth, wherein the decorticating members are formed by polygonal discs (11, 12) which are concave towards the inlet side and convex towards the outlet side, the surfaces of said discs being, at least on their convex side, formed by planar areas confined by straight lines going from the disc corners to the rotor axis, consecutive discs being mounted with an angular shift with respect to one another.

2. An apparatus according to claim 1, wherein consecutive discs (11, 12) of the rotor are symmetrically shifted.

3. An apparatus according to claim 1, wherein the rotor discs are quadrangular.

4. An apparatus according to claim 1, wherein the rotor discs are triangular.

5. An apparatus according to claim 1, wherein the foraminous portion (2) of the casing, as viewed in the direction of rotation of the rotor, is extended from bottom to top.

6. An apparatus according to claim 1, wherein the casing has a portion (1) with an inner rough surface, said portion, as viewed in the direction of rotation of the rotor, coming before the foraminous portion (2) of the casing.

7. An apparatus according to claim 1 wherein the outlet (7) is placed at least at the level of the axis (10) of the rotor, or at a higher level.

8. An apparatus according to claim 7, wherein the cross-sectional area of the discharge outlet (7) is adjustable.

9. An apparatus according to claim 1, wherein the rotor is arranged eccentrically within the casing and is shifted towards the foraminous portion thereof.

References Cited

UNITED STATES PATENTS

| | | | |
|---|---|---|---|
| 357,317 | 2/1887 | Hascall | 241—73 X |
| 2,656,122 | 10/1953 | Börner | 241—260 X |
| 2,996,260 | 8/1961 | Carder | 241—73 |
| 3,018,972 | 1/1962 | Steinmetz | 241—191 X |
| 3,233,836 | 2/1966 | Merges | 241—73 |

ROBERT C. RIORDON, Primary Examiner

D. G. KELLY, Assistant Examiner

U.S. Cl. X.R.

241—163, 255